March 3, 1970  B. HERRMANN  3,498,573
HELICOPTER DRIVE SYSTEM
Filed June 5, 1967
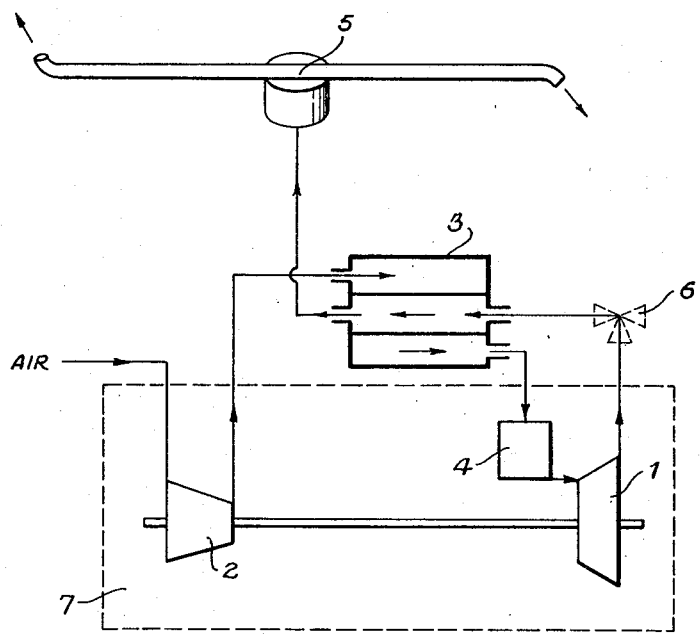
INVENTOR
*Bruno Herrmann*
BY *Bailey, Stephens and Huettig*
ATTORNEYS

United States Patent Office 3,498,573
Patented Mar. 3, 1970

3,498,573
HELICOPTER DRIVE SYSTEM
Bruno Herrmann, Bridgeport, Conn., assignor to Motoren- und Turbinen-Union, Munich-Allach, Germany
Filed June 5, 1967, Ser. No. 643,533
Claims priority, application Germany, July 2, 1966, M 70,076
Int. Cl. B64c 27/12
U.S. Cl. 244—17.11       2 Claims

ABSTRACT OF THE DISCLOSURE

Compressed air flowing from an air compressor to a gas turbine is passed through a heat exchanger for cooling the exhaust gas coming from the gas turbine. The cooled exhaust gases then drive a helicopter rotor by being discharged through the tips of the rotor blades. Cooling the turbine exhaust gases enables rotor blades of less cross-sectional area.

---

This invention relates to a helicopter drive system comprising a turbojet engine, a helicopter rotor, and a heat exchanger.

Helicopter rotors driven by reaction forces generated by gases or air blown out at the rotor tips are generally known. Likewise, the generation of the required gases or air by means of gas turbines is also known. Furthermore, a combination of gas turbines and helicopter rotors is known, whereby a gas turbine driven compressor produces compressed air which is routed to the helicopter rotor and emerges at the rotor blade tip to produce the desired thrust. Finally, a combination of gas turbines and helicopter rotors is known in which a turbojet engine blows its hot gas direct into the helicopter rotor, the hot gas emerging at the rotor tips to produce the required thrust.

The thermodynamical efficiency of the first method, in which compressed air is fed to the rotor, is not very high, since the generation of thrust is carried out at relatively low temperatures, and since losses are encountered in several stages of the cycle. Although the method of delivering hot gas to the helicopter rotor is considerably better, from a thermodynamical point of view, it nevertheless requires a large volume of a very hot gas to be routed through the rotor which necessitates large ducts in the rotor and the application of special heat insulation. The frontal area of the rotor will be increased and thus its drag. The advantages gained by using a superior thermodynamical process are thus, at least partially, lost again in the final result.

It is the object of this invention to create a drive system for a helicopter rotor which, while providing a satisfactory solution from the thermodynamical aspect, will still permit the use of a rotor frontal area, the drag of which remaining within reasonable limits.

To solve this problem, a heat exchanger is used in this invention, said heat exchanger being arranged, on the hot gas side, between the turbojet engine and the helicopter rotor and releasing its heat to the compressed air coming from the compressor.

Although, in the solution according to this invention, the outlet momentum of the gases at the rotor outlet is reduced as compared to other solutions heretofore known, it is nevertheless, at the same time, possible to reduce the frontal area and thus the losses caused by rotor drag by using smaller gas ducts and less insulation, and thus more than compensating the above-mentioned loss of thrust. At the same time, the rotor will also become lighter, which in turn will more than compensate the additional weight of the heat exchanger. The main advantage of this combination of turbojet engine, heat exchanger and helicopter rotor, however, is the fact that a considerable quantity of fuel can be saved by means of the heat exchange. Thus, the economy of this drive system is considerably improved.

The means by which the objects of this invention are obtained are described more fully with reference to the accompanying schematic drawing.

Turbine 1 drives compressor 2, which delivers fresh air to heat exchanger 3. The air, heated in the heat exchanger, leaves the latter and flows into combustion chamber 4 where it is heated further by fuel combustion. From there the combustion gases are routed into turbine 1 where the gas is expanded to such a degree as to enable the turbine output to cover the compressor requirements (and the other usual losses on bearings and accessories). The compressed gas from the turbine flows to heat exchanger 3 where it releases a part of its heat to the fresh air delivered by the compressor 2; from there the gas is routed to the rotor 5 of the helicopter. To facilitate the starting cycle of the engine, a three-way valve 6, acting as by-pass valve, may be required under certain conditions. This valve is positioned in the pipe leading the turbine exhaust gases to the heat exchanger 3. The turbojet engine 7 is composed of compressor 2, turbine 1 and combustion chamber 4.

Having now described the means by which the objects of the invention are obtained, I claim:

1. A drive system for a helicopter comprising a hot gas turbine having a fuel combustion chamber, an air compressor driven by said turbine, helicoptor rotor blades, and heat exchanger means between said air compressor and said combustion chamber for cooling the hot turbine exhaust gas by the compressed air and preheating the compressed air flowing into said combustion chamber, and pipe means for conveying the cooled turbine exhaust gases to said rotor blades for discharge through the tips of said blades.

2. A drive system as in claim 1, further comprising an exhaust gas pipe joining said gas turbine and said heat exchanger, and a three-way valve mounted in said exhaust pipe for facilitating engine starting.

References Cited

UNITED STATES PATENTS

| | | | |
|---|---|---|---|
| 2,516,489 | 7/1950 | Stalker | 170—135.4 |
| 2,956,627 | 10/1960 | Bayne | 170—135.4 |
| 3,116,604 | 1/1964 | Holl | 60—39.51 XR |
| 3,375,996 | 4/1968 | Wilde | 170—135.71 XR |

CARLTON R. CROYLE, Primary Examiner

U.S. Cl. X.R.

60—39.16, 39.51; 170—135.4